United States Patent
Watson et al.

(10) Patent No.: US 6,640,715 B1
(45) Date of Patent: Nov. 4, 2003

(54) WEARING APPAREL WITH SCENTED INK

(76) Inventors: Patrick L. Watson, 4067 Sarazen, Mesquite, TX (US) 75150; Joshua L. Hewitt, 1112 Ridgeview St., Mesquite, TX (US) 75149

(*) Notice: Subject to any disclaimer, the term of this patent is extended or adjusted under 35 U.S.C. 154(b) by 0 days.

(21) Appl. No.: 09/943,792

(22) Filed: Aug. 31, 2001

(51) Int. Cl.[7] .................................................. B41L 47/56
(52) U.S. Cl. ........................ 101/484; 101/114; 101/118
(58) Field of Search ................................ 101/484, 118, 101/114

(56) References Cited

U.S. PATENT DOCUMENTS

| | | | |
|---|---|---|---|
| 4,555,438 A | 11/1985 | Orsak et al. | 428/219 |
| 4,574,181 A | 3/1986 | Spector | 219/274 |
| 4,730,556 A * | 3/1988 | Cobbs, Jr. | 101/114 |
| 4,822,376 A | 4/1989 | Tucci | 8/478 |
| 5,024,008 A * | 6/1991 | Maples | 36/1 |
| 5,093,182 A | 3/1992 | Ross | 428/195 |
| 5,480,506 A * | 1/1996 | Mahn, et al. | 156/230 |
| 5,577,947 A * | 11/1996 | Malloy et al. | 101/491 |
| 5,665,458 A * | 9/1997 | Mahn, Jr. | 428/200 |
| 5,817,385 A | 10/1998 | Stanislav | 428/40.2 |
| 5,924,221 A * | 7/1999 | Schuver et al. | 36/136 |
| 5,970,300 A | 10/1999 | Acquaviva | 399/341 |
| 5,975,675 A | 11/1999 | Kim | 347/20 |
| 5,995,770 A | 11/1999 | Rochford et al. | 396/311 |
| 6,004,666 A * | 12/1999 | Hornig et al. | 283/56 |
| 6,089,947 A | 7/2000 | Green | 446/268 |
| 6,101,981 A * | 8/2000 | Friend et al. | 119/860 |
| 6,113,895 A | 9/2000 | McCain | 424/84 |
| 6,115,956 A | 9/2000 | Firmin | 43/42.06 |
| 6,261,347 B1 * | 7/2001 | Moreland | 106/31.02 |
| 6,322,033 B1 * | 11/2001 | Lee | 248/346.01 |
| 6,385,783 B1 * | 5/2002 | Eliason | 4/245.1 |
| 2001/0043469 A1 * | 11/2001 | Carpenter et al. | 362/161 |
| 2002/0123437 A1 * | 9/2002 | Conboy et al. | 510/101 |
| 2002/0174800 A1 * | 11/2002 | Moreland | 106/31.02 |

FOREIGN PATENT DOCUMENTS

JP        07052521 A    *    2/1995        B41M/3/12

* cited by examiner

*Primary Examiner*—Charles H. Nolan, Jr.
(74) *Attorney, Agent, or Firm*—Roger N. Chauza, Esq.; Chauza & Handley, LLP

(57) ABSTRACT

A process in which a scented ink is applied to an article. An oil-based scent is mixed with a plastisol-type ink and applied to an article, such as a t-shirt. All layers of the ink forming the design, including the base layer, the color layers and a top special effects clear plastisol ink, include the scent. The combination of a plastisol ink and the oil-based scent results in a design with a positive "hand", where elevated temperatures activate the scent.

18 Claims, 1 Drawing Sheet

WEARING APPAREL WITH SCENTED INK

TECHNICAL FIELD OF THE INVENTION

The present invention relates in general to scented articles, and more particularly to wearing apparel with scented designs.

BACKGROUND OF THE INVENTION

The merchandising of wearing apparel is a significant industry and represents millions of dollars for businesses and billions of dollars for the national economy. While clothes in general provide the basic function of covering one's body and providing an insulation from the environment, the sales of clothes involves much more than the appeal to these basic interests. Brand names, style, design and other considerations are factors that are brought into focus in the marketing and merchandising of wearing apparel. Many designers highlight their clothing lines with logos, colors, designs and other insignia to distinguish their wearing apparel from that of competitors. Jeans have designer logos on the hind pockets, sports shirts bear the logos of the makers on the sleeves or pockets, socks have stitched insignia, t-shirts have numerous designs imprinted thereon, and other clothing items bear many different types of insignia to identify the makers thereof.

The sales of t-shirts and sweat shirts is an enormous industry, especially when coupled with an entertainment event. While the cost of the raw materials of a t-shirt may be under a dollar, or so, the price of a t-shirt embossed with a design and sold at an event may cost upwardly of $20. The designs applied to a t-shirt are limited only by the imagination of the designer. Multi-color designs are common, as are catchy slogans and the like. The competitiveness of such an industry is readily apparent at sports events, such as auto racing, football, basketball, baseball, etc. Other entertainment events such as rock concerts, festivals, social gatherings, etc., also provide respective forums for the marketing of such type of wearing apparel.

The process of placing a design on at-shirt, sweat shirt or other wearing apparel includes many considerations, the least of which is the selection of an ink which will endure a reasonable number of washing and drying cycles. In order to mass produce wearing apparel with designs applied thereto, a process must be used which allows multiple colors to be applied to the garment, and allowed to set or dry in a short period of time. Carousel equipment is readily available for printing complicated multicolor designs on t-shirts, at a rate of 800 t-shirts or more an hour. The design of the insignia is facilitated by the availability of computer equipment which allows a design to be easily copied or generated and transferred to a stencil, silk screen or other ink application equipment.

The t-shirt embossing industry constantly strives for an advantage over the respective competitors. New inks and processes continue to be developed to achieve better and more brilliant colors, more realistic designs with intricate shapes and definition. Inks are presently available for providing garment designs with a better "hand". The "hand" of the design refers to the softness of the ink after a number of layers or colors have been applied to the material. Typically, various inks and/or layer of ink applied to a material makes the garment material somewhat stiff, resulting in a negative hand. Hence, by using more colors in a design, the the appearance is enhanced, but the softness of the finished product is often compromised.

While the development of new apparel designs continues to make the articles more aesthetically appealing, there is generally a lack of development of the incorporation of scented designs into wearing apparel. Again, any scented design involving an ink must be able to withstand a reasonable number of conventional washing and drying cycles, be non-allergenic and cost effective.

Inks typically used in printing text on paper are of the extract type, or are "essential" oil type scents. These scents generally do not have the longevity as compared to synthetic scents.

From the foregoing, it can be seen that there is a need for a new scented ink and application process for applying the same to an article. Another need exists for a scented design that can be applied easily and economically to wearing apparel. Yet another need exists for a process for applying a scent or fragrance to a design, which matches or is associated with the design.

SUMMARY OF THE INVENTION

The present invention disclosed and claimed herein, in one aspect thereof, comprises a scented ink that is applied to wearing apparel, such as a t-shirt. An oil-based scent, such as the type used for making scented candles, is mixed with a plastisol-type ink and applied to the wearing apparel using conventional screen print techniques. With this type of scent, the application of heat or warmth to the wearing apparel releases the scent. The scent used can match the design applied to the garment. For example, a grape scent can used with purple-colored ink to make a clustered grape design on the garment.

In accordance with another feature of the invention, layers of ink are employed to make the design, with each layer being scented. This process provides a longer lasting scent to the design when applied to an article. A first application of scented ink can be used a base layer for dark or light-colored material to provide a neutral color for applications of other colors thereon. Subsequent applications of scented inks, which may be different colored shapes and designs can be applied over the base layer. In a preferred form of the invention, each layer of a design would have the same scent. Lastly, an application of a clear scented ink can be used as a top coating to provide a shiny surface to all or selected portions of the design. By using a plastisol-type of ink, the colored and scented design has a high quality positive "hand", i.e., a rubbery and soft texture to the feel.

According to other features of the invention, different thicknesses of stencils can be used on screens to provide different thicknesses of scented ink on the materials, thereby providing a larger source of the scent and allowing the scent to last a longer period of time.

DESCRIPTION OF THE DRAWINGS

Further features and advantages will become apparent from the following and more particular description of the preferred and other embodiments of the invention, as illustrated in the accompanying drawings in which like reference characters generally refer to the same parts, elements or functions throughout the views, and in which.

DETAILED DESCRIPTION OF THE INVENTION

While the invention is described below in connection within the application of a scented design on a garment, the principles and concepts of the invention can be applied as well to other mediums, such as panels, metals, upholstery, personal items and many other articles susceptible for accepting a design. As used herein, a "design" may include any insignia, slogan, word, symbol, etc.

In the preferred form of the invention, a scented design is applied to a t-shirt, such as the type sold at an event. For example, t-shirts are a popular item sold at regular season football and bowl games. A t-shirt sold, for example, at the Orange Bowl, can have imprinted thereon a design of one or more oranges with an orange scent. The Citrus Bowl is an opportunity for selling t-shirts with a citrus fruit design and a citrus scent. Many other applications are possible, such as, a smoke/tire burning scent for t-shirts sold at an auto racing event, a marijuana smell on t-shirts sold at a rock concert, a food scent on t-shirts sold at restaurants and food festivals, etc. Popular perfume scents can also be used in connection with screen print inks applied to sweaters and blouses for women. For outdoor activities and events, an insect repellent can be mixed with the ink and applied to the t-shirt, sweat shirt, or other apparel to prevent the annoyance of insects.

There are a number of scents that are presently considered to have beneficial medicinal effects. Such scents can also be applied to articles so that persons in the vicinity thereof can smell the scents and receive the benefits thereof. These scents, many of which are essential oils, include Italian bergamot, Brazilian bois de rose, Moroccan chamomile, cinnamon, Russian clary sage, Spanish eucalyptus, Russian fir needle, frankincense, Florida grapefruit, French lavender, California lemon, West Indian lime, Italian mandarin orange, Spanish marjoram, Musk, Indonesian patchouly, American peppermint, Canadian pine needle, rose, Spanish rosemary, Brazilian tangerine, Australian tea tree, Spanish thyme and Ylang ylang, etc.

While not considered to be exhaustive, the list of other scents that can be employed in connection with screen printing on articles, include the scents of plants, trees, flowers, shrubs, fruits, spices, vegetables, kitchens, the outdoors, animals, farms, factories, the sea, air, machinery, medicinal scents, wood, chemicals, petroleum products, etc.

Figure 1:
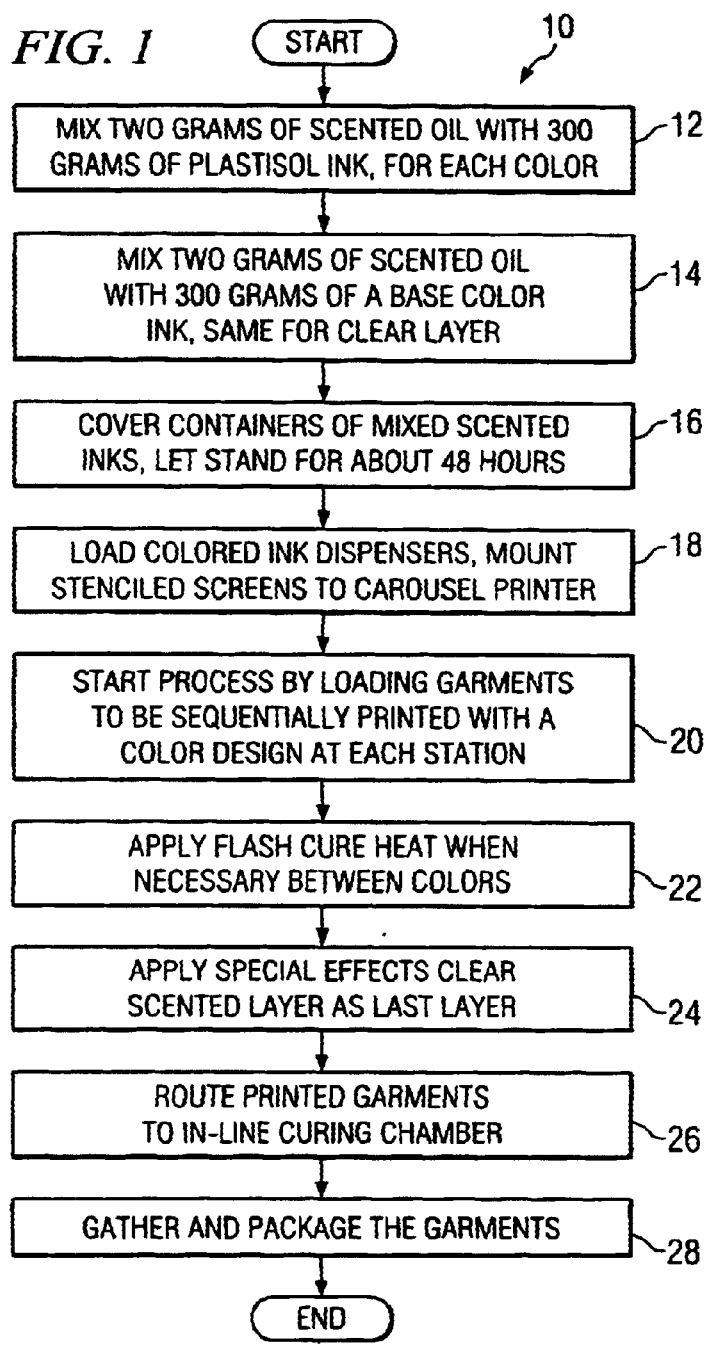
FIG. 1 illustrates a flow chart of the steps carried out in making a scented design according to a preferred embodiment.
Figure 2:
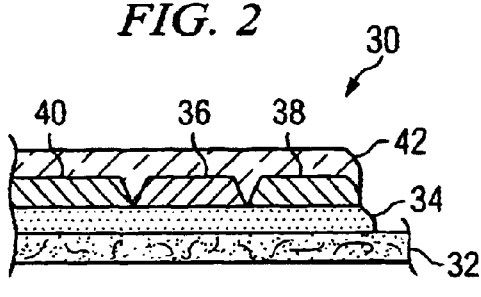
FIG. 2 illustrates the various layers or applications of scented ink in making a design.

Reference is now made to FIG. 1 of the drawings where there is shown a flow chart of the basic operations 10 in providing a scented garment. It has been found that a composition of a scented ink includes a plastisol-type screen print ink and an oil-based scent, much like the type used in making scented candles. With this type of scent, heat imparted to the scented design releases the scent from the ink. Hence, every time the garment is washed and dried, the scent from within the plastisol ink is moved to the surface of the ink and released. Depending on the amount of heat needed to release the scent, a garment made according to the invention may be heated sufficiently by the environmental heat of the sun to reactivated the scent. Candle-type scents and plastisol inks are readily available to those skilled in the art and need not be specially manufactured. It should be understood that scents other than those used in candle making can be used with the invention. In addition, those skilled in the art may choose to use other types of scents and inks without departing from the present invention.

In block 12 of FIG. 1, the steps are identified for mixing the scented oil and the ink. Here, two grams of a liquid oil-based scent is mixed with about 300 grams of a plastisol ink of the color desired. Different colored plastisol inks are available in gallons, or other volumes. Preferably, the scented oil is of a concentration of about 6.8%, namely about 6.8 parts (per unit weight) of the scent, and about 93.2 parts (per unit weight) of a petroleum-based carrier. Generally, the same amount of scented oil is used with a given amount of the plastisol ink, irrespective of the type of scent. As will be described below, plastisol is selected because it has a characteristic of a positive hand when applied in thick layers, or with plural thin layers. Other inks tend to have a negative hand when applied in layers, the result of which is that the material becomes stiff to the feel.

As noted in block 14, a container of plastisol ink, which will form the base layer of the design, is also mixed with the scented oil. A container of a special effects clear plastisol ink is similarly mixed with the scented oil. As can be appreciated, the same amounts noted above are mixed together, and the same scent is generally employed in the colored plastisol inks, the base layer plastisol ink and the special effects clear plastisol ink. The base layer plastisol ink is generally a white ink for covering the entire area of the material to be covered by the design. The white plastisol ink tends to visually isolate the color of the garment material from the colored inks applied thereon. In accordance with the invention, the base layer of the plastisol ink, with the scented oil therein, is applied to every garment, irrespective of the color of the garment. With this arrangement, the base layer of the white plastisol ink functions as an additional source of the scent, thereby increasing the longevity of the scent of the design. Indeed, in order to further increase the amount of scent imbedded in the design, several layers of the base ink can be used. Since the ink is chosen in the preferred form of the invention to be a plastisol ink, the hand of the design remains positive, as compared to that which would be achieved with other conventional screen print inks. The same mechanism for increasing the mass or volume of the scented ink can be used by employing multiple or thick layers of the special effects scented ink.

In any event, each color of the plastisol ink is mixed in a container and allowed to set for a period of time in a closed container. While not critical, the mixture is allowed to set for about 48 hours. This time period allows the fragrance to permeate the ink and to become a homogenous mixture. This process step is shown in block 16.

Once the mixed containers of the scented plastisol ink have aged for a period of time, the containers are opened and loaded into the respective reservoirs of the stations of a screen print carousel. With such type of automated mechanism, each station is fitted with a mesh screen having a specific stencil design. The stenciled screen is coupled to the particular reservoir of colored and scented screen print ink. This is shown in block 18. At each station there is an ink applying mechanism to force the colored/scented ink through the stenciled screen onto the underlying garment. In order to transfer the ink design to a number of garments, the dwell time for the garment at each station of the carousel is about two seconds.

In step 18 of the process, the various stenciled screens are also loaded into the respective stations. It is noted that generally, each color of a multi-color design is associated with a different stencil because the shape of each color area of a design is different. If the sequence of the colors applied to the garment is important, then the colors are loaded in the proper sequence. Since the base color is applied first in the preferred embodiment of the invention, the white base color (or other base color coat) is loaded in the first station of the caroused to be applied first. In like manner, the special effects clear is the last color to be applied over all the other colors, and thus the clear coat ink is loaded in the last station of the carousel. In the event that it is desired to flash cure one color during the printing process, then a high temperature dryer can be installed in a station that comes after the color to be flash cured. The high speed curing of a color may be desired to prevent color bleeding between two adjacent colors.

In block 20 of the process flow, the screen printing process begins by loading the garments, either manually or automatically, onto the garment carriers of the carousel equipment. As the carousel garment carriers rotate and move into a position adjacent a print screen, the carriers stop for about two seconds to be printed with the color of the scented ink loaded into the station. The scented colors are sequentially applied to each garment in the manner noted. As shown in block 22, if the scented color of a station requires a flash cure, then a carousel station is not fitted with color printing apparatus, but rather is fitted with a heater that provides heated air at a temperature of about 1100 degrees Fahrenheit. Many types of screen printing carousels are designed so that each station can be fitted with color printing apparatus, heaters, etc., all that are interchangeable when needed.

The last ink coating applied to the color design is a special effects clear, as shown in block 24. This ink coating covers all the other colors previously applied, and creates a shiny surface that is aesthetically pleasing. The special effects clear coating is also a plastisol ink that is scented with the same scent as used in the other colors of the design.

With regard to block 26, after the special effects clear has been applied to the design, the garments are routed to an in-line furnace or dryer where a temperature of about 325 degrees Fahrenheit is maintained. The garments pass through the dryer on a wire conveyor and are maintained at such temperature for about 45 seconds. Once the ink printed on the garments has cured, the garments are gathered, either manually or automatically, and packaged for shipment. This is shown in block 28.

Figure 3:
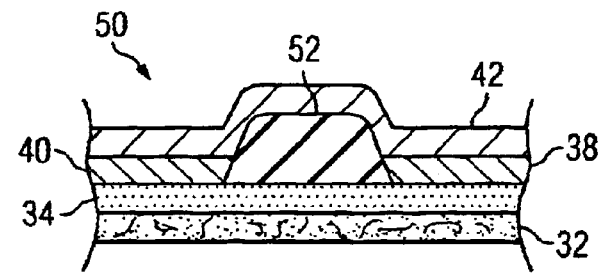
FIG. 3 illustrates the use of different thicknesses of scented ink for a design.

FIG. 3 is a cross-sectional view of a screen printed design 30 made according to one embodiment of the invention. Here, there is shown a fabric 32 as the material on which the design is printed. As noted above, the material is not limited to fabrics, but may be any material susceptible for receiving thereon a screen printed design. The base layer 34 of scented ink is screen printed over the entire area that is to receive the design. A first color 36 of the design is printed on the base layer 34. Next, a second color 38 is screen printed on the base layer 34. The first and second colors 36 and 38 need not be screen printed adjacent to each other. A third color 40 is screen printed on the base layer 34. Lastly, the special effects clear layer 42 is screen printed over the entire area of the design. In certain cases, the special effects clear coating may be applied over only a selected portion of the design. Importantly, all the color layers 36–40, as well as the base layer 34 and the special effects layer 42 are scented with the same scent. This increases the reservoir of the scent and provides a longer lasting fragrance.

From the foregoing, it is noted that in the preferred embodiment of the invention, the same scent is used for all the screen print inks used in a design. This is not a necessity, as it is possible to produce a design with two or more different scents. For example, the design of a cluster of oranges and leaves may be made with a orange ink scented with an orange scent, and with a green ink scented as leaves for the green part of the design. Moreover, if it is desired to make the leaf scent less prominent, then only the green ink or the special effects ink covering the leaves need be scented. Alternatively, the concentration of the leaf scent in the green ink can be less, as compared to the concentration of the orange scent in the orange ink. For a prominent orange scent, all ink layers above and below the orange design would be scented with an orange scent. With this arrangement, the special effects ink forming the top ink layer would be applied at different screen print stations, one with the orange scented special effects ink, and the other station loaded with a leaf scented special effects ink. It can be seen that different combinations of colors, scents and amounts of scent are possible according to the principles of the invention.

FIG. 3 illustrates another embodiment 50 of the invention for increasing the amount of scent held by an ink design. In this design 50, one area 52 of the design 50 is made with a thicker layer of scented ink. This can be accomplished by using a thicker stencil, thereby allowing a thicker layer of ink to be deposited on the base material 34. By using a thicker portion of the design, a three dimensional or textured effect can also be created.

Although the preferred and other embodiments have been described in detail, it should be understood that various changes, substitutions and alterations can be made therein without departing from the spirit and scope of the invention, as defined by the appended claims.

What is claimed is:

1. A method of applying a design to an article, comprising the steps of:

mixing an oil-based scent to an ink to provide a scented ink;

using a screen print apparatus for applying the scented ink in a design to the article; and covering the oil-based scented ink with a clear scented ink.

2. The method of claim 1, further including using a candle wax scent of the type in which heat causes release of the scent.

3. The method of claim 1, further including forming a design on the article, where the scent of the ink matches the nature of the design.

4. The method of claim 3, further including using a design of a fruit, and using the scent in said ink that matches the type of fruit of the design.

5. The method of claim 1, further including using a scent that is activated by an elevated temperature.

6. The method of claim 5, further including a scent that is activated by heating the article in a dryer.

7. The method of claim 1, further including applying multiple applications of the scented ink to the article to increase a volume of the ink for release of the scent over a period of time.

8. The method of claim 7, further including applying a base coating of the scented ink, covering the base coating with a colored coating of a scented ink, and covering the colored scented ink with the clear scented ink.

9. The method of claim 1, further including using a plastisol ink and mixing in the plastisol ink a scent used for making candles.

10. The method of claim 1, further including selecting a scent selected from the group consisting of fruit scents, vegetable scents, spice scents and medicinal scents.

11. A method of applying a design to textiles, comprising the steps of:

applying a base layer of a scented ink to the textile;

applying at least one coating of a scented and colored ink over at least a portion of the base layer of ink; and applying a top outer coating of a clear and scented ink over at least a portion of the design, whereby each layer of the scented ink contributes to the release of the scent.

12. The method of claim 11, further including applying the scented ink using a plastisol-type ink and an oil-based scent.

13. The method of claim 11, further including using a scented oil of the type used in making scented candles, in which heat causes release of the scent.

14. The method of claim 11, further including using scented, colored coatings with different thicknesses.

15. The method of claim 11, further including using a scent that is activated by an elevated temperature of the wearing apparel.

16. The method of claim 11, further including using an ink adapted for screen-type printing.

17. A textile made according to the method steps of claim 11.

18. An article made according to the method steps of claim 1.

* * * * *